(12) United States Patent
Zhou

(10) Patent No.: US 11,739,914 B2
(45) Date of Patent: Aug. 29, 2023

(54) PHOTOGRAPHY LAMP

(71) Applicant: APUTURE IMAGING INDUSTRIES CO., LTD., Guangdong (CN)

(72) Inventor: Binbin Zhou, Guangdong (CN)

(73) Assignee: APUTURE IMAGING INDUSTRIES CO., LTD., Guangdong (CN)

(*) Notice: Subject to any disclaimer, the term of this patent is extended or adjusted under 35 U.S.C. 154(b) by 6 days.

(21) Appl. No.: 17/646,525

(22) Filed: Dec. 30, 2021

(65) Prior Publication Data

US 2023/0075985 A1 Mar. 9, 2023

(30) Foreign Application Priority Data

Sep. 7, 2021 (CN) .......................... 202122159086.0

(51) Int. Cl.
*F21V 17/18* (2006.01)
*F21V 15/01* (2006.01)
*G03B 15/02* (2021.01)

(52) U.S. Cl.
CPC .............. *F21V 17/18* (2013.01); *F21V 15/01* (2013.01); *G03B 15/02* (2013.01)

(58) Field of Classification Search
CPC ... F21V 17/18; G03B 15/02; F21W 2131/406
See application file for complete search history.

(56) References Cited

U.S. PATENT DOCUMENTS

| 3,591,796 A | * | 7/1971 | Barker | ...................... F21L 2/00 315/86 |
| 6,244,730 B1 | * | 6/2001 | Goldberg | ................ F21V 17/20 362/268 |
| 2010/0124068 A1 | * | 5/2010 | Karie | ..................... G03B 15/02 29/592 |

FOREIGN PATENT DOCUMENTS

| CN | 108317483 | * | 7/2018 | ............. F21V 17/02 |
| CN | 113093452 | * | 7/2021 | ............. G03B 15/02 |
| WO | WO 2018/115905 | * | 6/2018 | ............. F21V 17/00 |

* cited by examiner

*Primary Examiner* — Zheng Song

(57) ABSTRACT

The present disclosure provides a photography lamp. The photography lamp includes a housing, an ejector rod, and a bracket. The housing includes a front housing and a midframe, an accessory slot is arranged on a side of the front housing, the bracket is arranged on another side of the front housing away from the accessory slot and slidably connected to the front housing; the bracket includes a connecting rod and a pushing rod connected at an included angle. The space occupied by the bracket is reduced, and the structure of the photography lamp is more compact and smaller.

15 Claims, 6 Drawing Sheets

PHOTOGRAPHY LAMP

PRIORITY CLAIM

This disclosure claims priority to Chinese Patent Disclosure Number 202122159086.0 filed Sep. 7, 2021, the disclosures of which are incorporated in their entirety by reference herein.

FIELD OF INVENTION

The present disclosure relates to lighting technology, and in particular to a photography lamp.

BACKGROUND OF INVENTION

In the case of shooting videos, TV series and photos, etc., soft boxes, hoods and other accessories are usually installed on the light-emitting side of a photography lamp to fill or illuminate the subject or scene. Furthermore, the photography lamp and accessories are usually connected by a Bowens mount. An ejector mechanism is arranged in the photography lamp. When the accessories are detachably installed on the light emitting side of the photography lamp through the Bowens mount, the accessories are limited and locked by an ejector rod of the ejector mechanism to avoid falling off from the photography lamp. After that, a pushing portion of the ejector mechanism can be manually pushed to drive the ejector rod to slide relatively to the photography lamp, so that release the locking of the ejector to the accessories and the accessories can be easily detached from the photography lamp.

However, the existing bracket occupies more internal space of the photography lamp, thereby increasing the overall volume of the photography lamp.

SUMMARY OF INVENTION

The present disclosure provides a photography lamp, which aims to solve the problem that the bracket used to drive the ejector rod to slide in the photography lamp occupies a large internal space, which leads to a large overall volume of the photography lamp.

An embodiment of the present disclosure provides a photography lamp comprising:

a housing with a front housing and a mid-frame, wherein an accessory slot with a through-hole is arrange on a side of the front housing, and an operating hole is opened on an outer surface of the mid-frame;

an ejector rod movably arranged in the through-hole;

a bracket arranged on another side of the front housing away from the accessory slot, wherein the bracket is slidably connected to the front housing; the bracket comprises a connecting rod and a pushing rod connected at an included angle, the pushing rod connected with a pushing portion extends along the front housing away from the accessory slot, the pushing portion is configured to pass through the operating hole, the connecting rod is connected to the ejector rod, and the pushing portion is used to receive the external force input by the user to drive the ejector rod to slide relative to the through-hole.

Optionally, the photography lamp further comprises a first sliding rod, wherein an end of the first sliding rod is connected to the side of the front housing away from the accessory slot, the first sliding rods extends along the front housing away from the accessory slot, and the first sliding rod is slidably connected with the bracket to enable the bracket to slidably connect with the front housing.

Optionally, the photography lamp further comprises an elastic member, one end of the elastic member is connected to the first sliding rod, and another end of the elastic member is connected to the bracket to apply an elastic force to the bracket to enable the bracket to slide along the front housing toward the accessory slot.

Optionally, the elastic member is sleeved on the first sliding rod; a first abutting portion is arranged on the first sliding rod, a second abutting portion is configured on the bracket, the first abutting portion and the second abutting portion are distributed on both side of the elastic member along the direction of the front housing toward the accessory slot; one end of the elastic member abuts against the first abutting portion, and another end of the elastic member abuts against the second abutting portion.

Optionally, a first mounting hole is formed on the connecting rod, the first sliding rod is slidably mounted in the first mounting hole to enable the first sliding rod to slidably connect to the bracket;

wherein a sliding portion slidably connected to the first sliding rod is provided on one end of the pushing rod away from the connecting rod.

Optionally, the first sliding rod is located on the side of the ejector rod close to the pushing rod; wherein the sliding portion is protudingly arranged on a side of the pushing rod facing the first sliding rod, and a surface of the sliding portion at one end in the protruding direction slidably abuts against the outer peripheral surface of the first sliding rod to enable the sliding portion to slidably connect to the first sliding rod.

Optionally, an accommodating groove is arranged on the side of the pushing rod facing the first sliding rod, part of the first sliding rod is disposed in the accommodating groove, and the elastic member is disposed in the accommodating groove.

Optionally, the first sliding rod comprises a first limiting portion arranged on a side of the bracket away from the elastic member, the first limiting portion is configured to abut against the bracket to limit a moving distance of bracket relative to the first sliding rod along the front housing toward the accessory slot.

Optionally, wherein a first cushion member is arranged on a side of the first limiting portion close to the bracket.

Optionally, the first sliding rod comprises a first sub-sliding rod and a second sub-sliding rod that are detachably connected in sequence along a length direction of the first sliding rod, one end of the first sub-sliding rod away from the second sub-sliding rod is connect to the front housing, the elastic member is sleeved on the first sub-sliding rod, wherein the first abutting portion is arranged on the second sub-sliding rod.

Optionally, the photography lamp further comprises a second sliding rod extending along the front housing away from the accessory slot, wherein one end of the second sliding rod is connected to the side of the front housing away from the accessory slot, the second sliding rod and the first sliding rod are arranged side by side along the length of the connecting rod, and the second sliding rod is slidably connected to the bracket.

Optionally, a connecting portion is configured to extend from one end of the connecting rod away from the pushing rod, the extending direction of the connecting portion is in line with the length direction of the connecting rod and the pushing rod; a mounting hole is arranged on the connecting portion, and the second sliding rod is slidably mounted in the mounting hole to enable the second sliding rod to slidably connect with the connecting portion.

Optionally, a second mounting hole is arranged on the connecting rod and configured to penetrate the connecting rod along the length direction of the ejector rod, and the second sliding rod is slidably mounted in the second mounting hole to enable the second sliding rod to slidably connect with the bracket.

Optionally, the second sliding rod is provided with a second limiting portion located on the side of the bracket along the front housing toward the accessory slot, the second limiting portion is configured to abut against the bracket to limit a moving distance of bracket relative to the second sliding rod along the front housing toward the accessory slot;

Optionally, a second cushion member is arranged on a side of the second limiting portion close to the bracket, Optionally, the second sliding rod is provided further with a stopping portion located on the side of the bracket along the front housing toward the accessory slot, and the stopping portion is configured to abut against the bracket to limit a moving distance of bracket relative to the second sliding rod along the front housing away from the accessory slot.

Beneficial Effect

In the photography lamp provided in the embodiment of the present disclosure, the bracket includes a connecting rod and a pushing rod connected at an included angle. The connecting rod is connected with the ejector rod, and the pushing rod extends in the direction of the front housing away from the accessory slot. In a condition that the bracket is installed in the housing, the connecting rod of the bracket is located on the side of the heat dissipation mechanism facing the front housing, and the pushing rod is located on the side of the heat dissipation mechanism facing the mid-frame with an operating hole. Therefore, the gap between the heat dissipation mechanism and the housing is fully used, and the space occupied by the bracket is reduced to make the structure of the photography lamp more compact and the overall volume smaller.

DESCRIPTION OF DRAWINGS

In order to explain the technical solutions and beneficial effects of the present disclosure more clearly, the description of embodiments is explained hereinafter with reference to the diagrammatic drawings.

Figure 1:
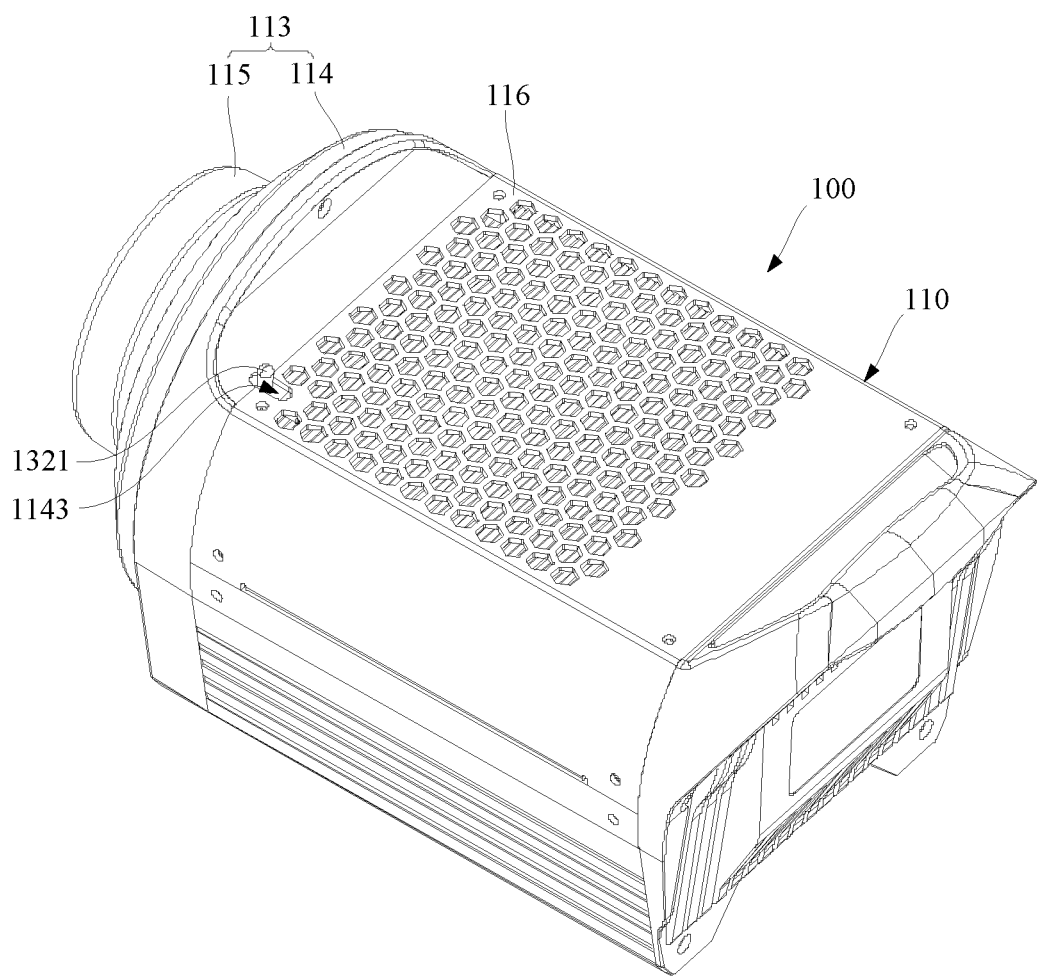
FIG. 1 is a schematic diagram showing a structure of a photography lamp provided by an embodiment of the present disclosure.

Photography lamp 100; housing 110; mounting cavity 111; front surface 112; front housing 113; through-hole 1131; front housing cover 114; accessory slot 1140; mounting slot 1141; bayonet 1142; operating hole 1143; fourth mounting hole 1144; front housing shell 115; mounting cylinder 1151; light-transmitting hole 1152; mounting plate 1153; mid-frame 116; heat dissipation mechanism 122; heat sink 1221; heat dissipation pipe 1222; ejector rod 1311; bracket 1314; connecting rod 1315; second abutting portion 1316; first mounting hole 1317; connecting portion 1318; second mounting hole 1319; pushing rod 1320; pushing portion 1321; sliding portion 1322; sliding groove 1323; accommodating groove 1324; first sliding rod 133; first sub-sliding rod 1331; first limiting portion 1332; threaded hole 1333; second sub-sliding rod 1334; first abutting portion 1335; threaded post 1336; screwdriver opening 1337; elastic member 134; first cushion member 135; second sliding rod 136; second limiting portion 1361; stopping portion 1362; second cushion member 137.

DETAILED DESCRIPTION OF PREFERRED EMBODIMENTS

The following content combines with the drawings and the embodiment for describing the present disclosure in detail. The same or similar reference numerals indicate the same or similar elements or elements with the same or similar functions It is obvious that the following embodiments are only some embodiments of the present invention, but should not be understood as a limitation to the present disclosure.

In the description of the present disclosure, it is to be understood that the orientation or positional relationship indicated by the terms such as "center", "portrait", "landscape", "length", "width", "thickness", "up", "down", "front", "behind", "left", "right", "vertical", "horizontal", "top", "bottom", "inner", "outer", "clockwise", "counter-clockwise" etc. is based on the orientation or positional relationship shown in the drawings, and is only for convenience of description of the present disclosure and simplified description, which is not indicating or implying that the device or component referred to must have a particular orientation, constructed, and operated in a particular orientation, thus it is not to be construed as limiting the present disclosure. Furthermore, the terms "first", "second", "third" and the like used solely for distinguishing the description, but are not to be construed as indicating or implying relative importance. Thus, features defining "first" or "second" may include one or more of the described features either explicitly or implicitly. In the description of the present disclosure, unless otherwise specified, the meaning of "a plurality" and "multiple" is two or more.

In the description of the present disclosure, unless otherwise specifically defined and limited, the terms "arranged" and "connected" are to be understood broadly, for example, it may be a fixed connection, a detachable connection, or an integration, and it may be a mechanical connection or an electrical connection. The specific meaning of the above terms in the present disclosure can be understood based on a specific case by those skilled in the art.

In the present disclosure, unless otherwise specifically specified and defined, the first feature being "on" or "under" the second feature may include direct contact of the first feature and second feature, and may also include a case where the first feature is not directly contacted with the second feature, but is contacted with the second feature through additional features between them. Moreover, the first feature being "on top of", "above" or "on the surface of" the second feature includes that the first feature is right above or obliquely above the second feature, or merely indicates that the first feature level is higher than the second feature. The first feature being "at the bottom of", "below" or "under" the second feature includes a case where the first feature is directly below and obliquely below the second feature, or merely indicates that the first feature level is less than the second feature.

In the present disclosure, unless otherwise specifically specified and defined, the first feature being "on" or "under" the second feature may include direct contact of the first feature and second feature, and may also include a case where the first feature is not directly contacted with the second feature, but is contacted with the second feature through additional features between them. Moreover, the first feature being "on top of", "above" or "on the surface of" the second feature includes that the first feature is right above or obliquely above the second feature, or merely indicates that the first feature level is higher than the second feature. The first feature being "at the bottom of", "below" or "under" the second feature includes a case where the first feature is directly below and obliquely below the second feature, or merely indicates that the first feature level is less than the second feature.

Embodiments of the present disclosure are described in detail below, examples of which are illustrated in the accompanying drawings, wherein the same or similar reference numerals indicate the same or similar elements or elements with the same or similar functions. The embodiments described below with reference to the drawings are exemplary only and are not to be construed as limiting the present disclosure. In addition, the present disclosure may repeat reference numerals and/or reference letters in different examples. Such repetition is for the purpose of simplification and clarity, and does not indicate the relationship between the various embodiments and/or settings discussed. In addition, this disclosure provides examples of various specific processes and materials, but those of ordinary skill in the art may be aware of other processes and/or the use of other materials.

The embodiment of the present disclosure provides a photography lamp. Detailed descriptions are given hereinafter.

Figure 3:
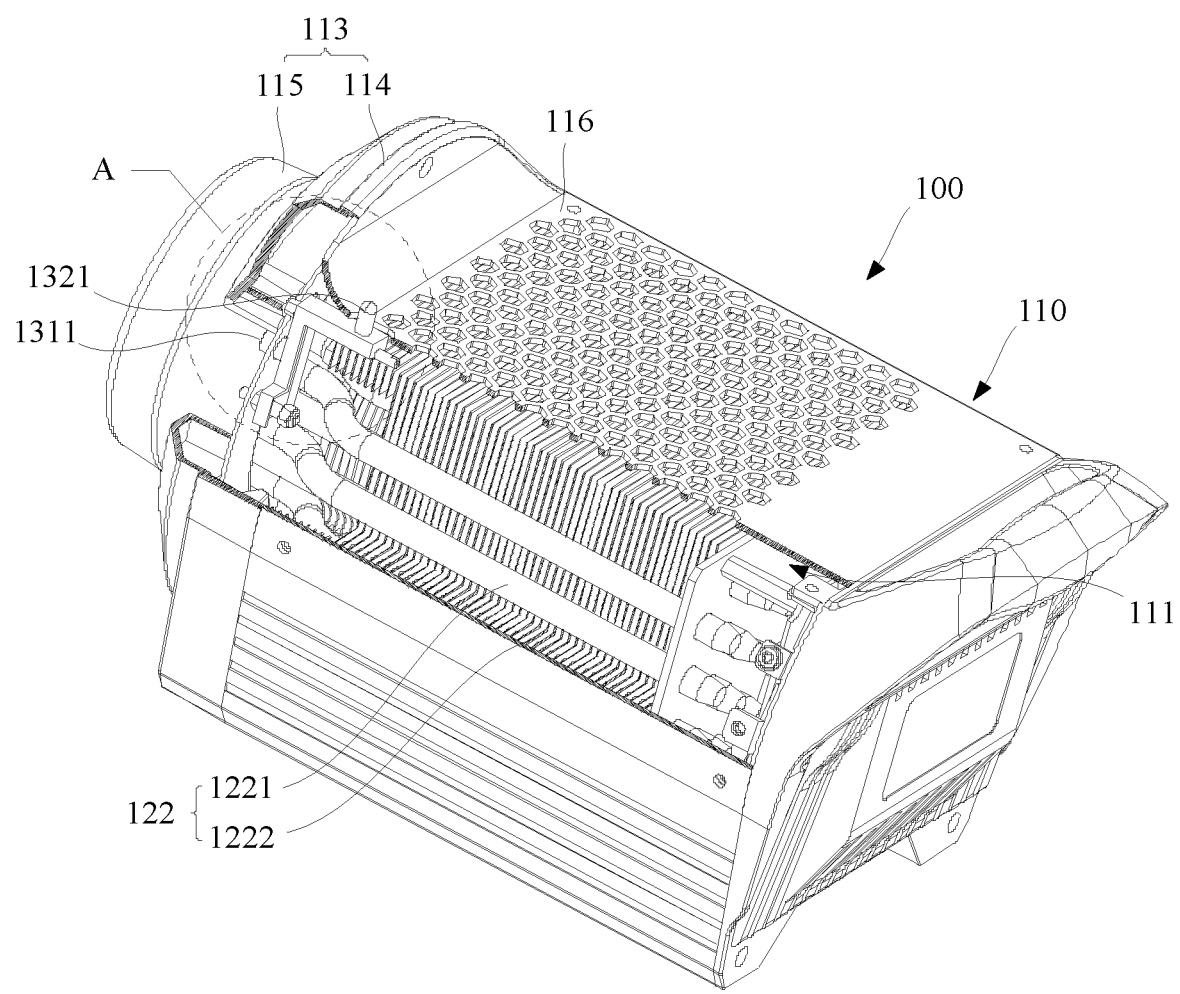
FIG. 3 is a partial cross-sectional view of the photography lamp provided in FIG. 1.

FIG. 1 is a schematic diagram showing a structure of a photography lamp 100 provided by an embodiment of the present disclosure. As shown in FIGS. 1 and 3, a photography lamp 100 comprises a housing and a light-emitting assembly (not shown in the figures). The housing 110 is provided with a mounting cavity 111. A light-transmitting hole 1152 is formed on a front surface 112 of the housing 110, the light-emitting assembly is installed in the housing 110. A light-emitting side of the light-emitting assembly is provided toward the light-transmitting hole 1152, so that the light emitted by the light-emitting assembly is emitted from a front side of the photography lamp 100 through the light-transmitting hole 1152.

A heat dissipation mechanism 122 connected to the light-emitting assembly is disposed in the mounting cavity 111 of the housing 110. In a condition that the light-emitting assembly emits light, heat of the light-emitting assembly can be dissipated by the heat dissipation mechanism 122 to prevent the light-emitting assembly from being damaged due to excessively high temperature. The heat dissipation mechanism 122 includes a plurality of heat sinks 1221 arranged in parallel and a heat dissipation pipe 1222 passing through the plurality of the heat sink 1221s in sequence. The heat dissipation pipe 1222 is connected to the light-emitting assembly to transfer the heat generated by the light-emitting assembly to the heat sinks 1221 and then to transfer the heat out of the housing 110. Wherein, the plurality of the heat sink 1221s of the heat dissipation mechanism 122 are generally arranged in a rectangular shape, and the plurality of the heat sinks 1221 are sequentially arranged at intervals along the direction from the front end to the rear end of the photography lamp 100.

An accessory slot 1140 which can be detachably connected with any of the accessories (not shown in the drawings) such as a lens group, a soft box, a light shield, and a standard cover is arranged on the front side of the housing 110. It can be understood that every accessory is provided as a male connecter with a socket, and the accessory slot 1140 is provided as a female connecter, so that different types of accessories can be changed onto the photography lamp 100 according to different usage scenarios.

Figure 2:
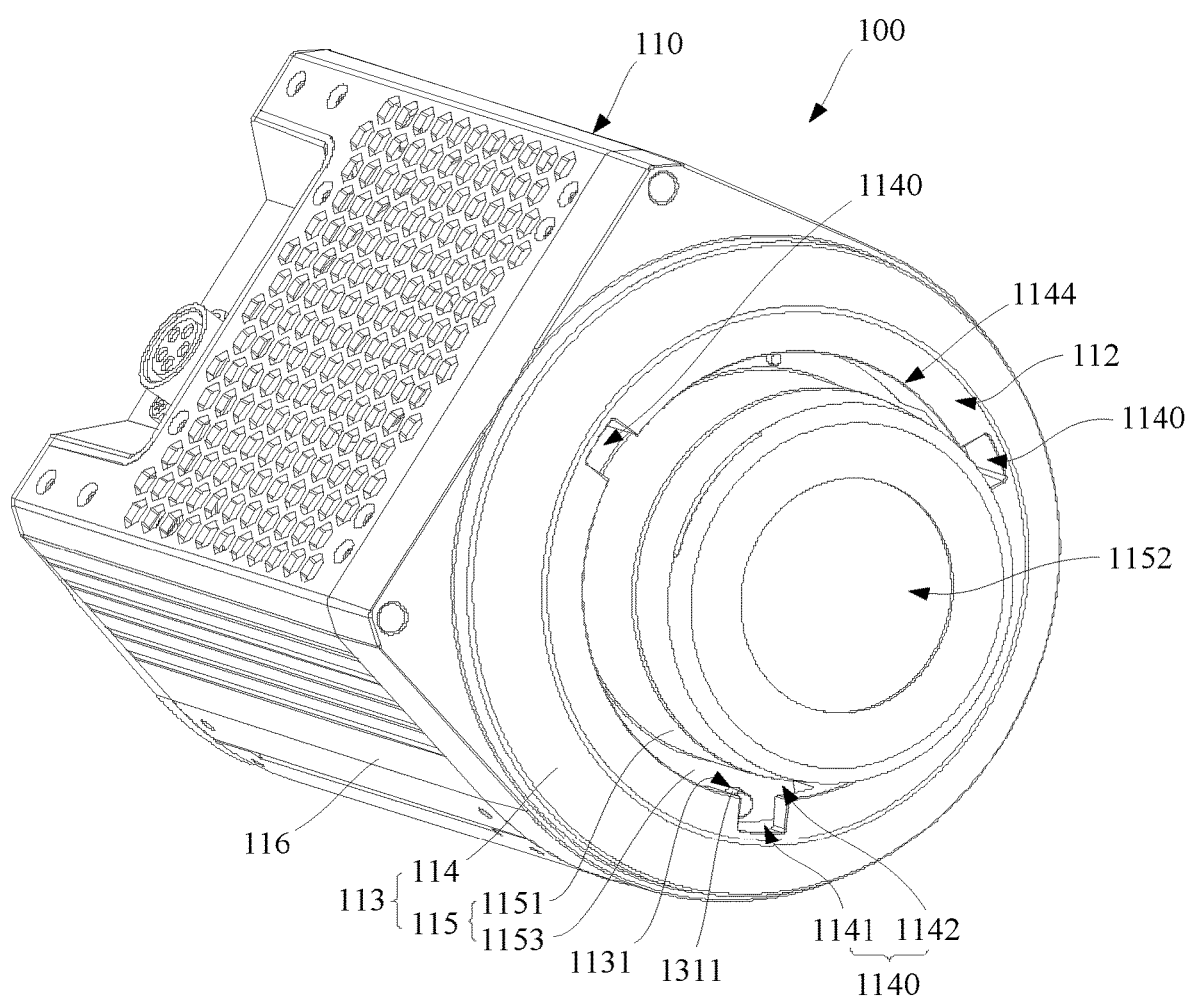
FIG. 2 is another angle view of the photography lamp in FIG. 1.

Wherein, as shown in FIG. 1 and FIG. 2, the housing 110 of the photography lamp 100 includes a front housing 113 and a mid-frame 116, an accessory slot 1140 is arranged on a side of the front housing 113. The mid-frame 116 is connected with the side of the front housing 113 away from the accessory slot 1140 and encloses to form the mounting cavity 111.

The front housing 113 is provided with the accessory slot 1140 on a side, and the accessory slot 1140 is used to connect with the accessory of the photography lamp 100 so that the accessory can be installed onto the photography lamp 100. The accessory slot 1140 comprises a mounting slot 1141 arranged on the side of the front housing 113 and a bayonet 1142 arranged on the inner surface of the mounting slot 1141.

In order to install the accessory onto the photography lamp 100, a clamping protrusion is disposed on the accessory at a position corresponding to each mounting slot 1141. When the accessory needs to be installed on the photography lamp 100, users can insert the clamping protrusion of the accessory into the mounting slot 1141 corresponding to the accessory slot 1140 of the photography lamp 100 and then rotate the accessory to make the clamping protrusion of the accessory click into the bayonet 1142 on the side of the mounting slot 1141. The operation is very convenient. Wherein a plurality of accessory slots 1140 are arranged on the front housing 113, and the plurality of accessory slots 1140 are distributed around the light-transmitting hole 1152.

Figure 4:
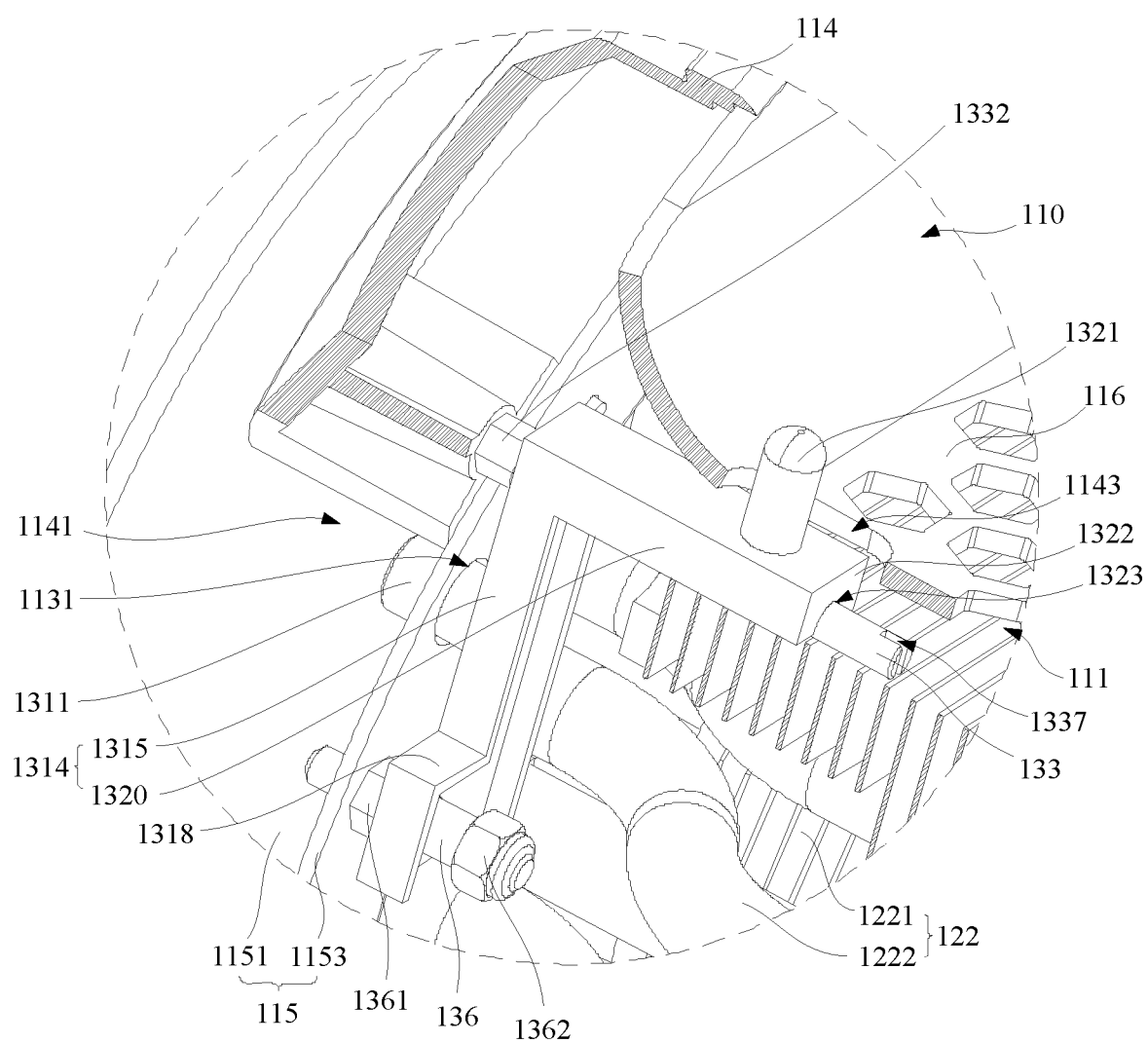
FIG. 4 is an enlarged view of part A in FIG. 3.

As shown in FIGS. 2 and 4, a through-hole 1131 is arranged in the accessory slot 1140. An ejector rod 1311 is movably arranged in the through-hole 1131. In a condition that the clamping protrusion of the accessory is inserted into the corresponding accessory slot 1140 on the photography lamp 100, the ejector rod 1311 can be controlled to move in the through-hole 1131 to lock the clamping protrusion by the ejector rod 1311. The clamping protrusion of the accessory is prevented from coming out of the accessory slot 1140, and the connection between the accessory and the photography lamp 100 is more stable.

Specifically, the through-hole 1131 is opened on the bottom surface of the mounting slot 1141 of the accessory slot 1140 and penetrates the front housing 113. In a condition that the clamping protrusion of the accessory is inserted into the corresponding accessory slot 1140 on the photography lamp 100, the ejector rod 1311 is squeezed by the clamping protrusion and retracted into the through-hole 1131 along the direction of the front housing 113 away from the accessory slot 1140 to avoid the clamping protrusion. In a condition that the accessory is rotated to make the clamping protrusion of the accessory lock into the bayonet 1142 on the side of the mounting slot 1141, the ejector rod 1311 can be extended into the accessory slot 1140 to hold the clamping protrusion in the accessory slot 1140. The clamping protrusion is prevented from coming out of the bayonet 1142, and the connection between the accessory and the photography lamp 100 is more stable.

As shown in FIGS. 3 and 4, the photography lamp 100 comprises a bracket 1314 arranged on another side of the front housing 113 away from the accessory slot 1140 and slidably connected to the front housing 113. The bracket 1314 is connected to the ejector rod 1311 and is used to receive the external force input by the user to drive the ejector rod 1311 to slide relative to the through-hole 1131.

Wherein, an operating hole 1143 is formed on an outer surface of the mid-frame 116. The bracket 1314 comprises a connecting rod 1315 and a pushing rod 1320 connected at an included angle, the pushing rod 1320 connected with a pushing portion 1321 extends along the front housing 113 away from the accessory slot 1140, the pushing portion 1321 is configured to pass through the operating hole 1143, the connecting rod 1315 is connected to the ejector rod 1311. The pushing portion 1321 is used to receive the external force input by the user to drive the ejector rod 1311 to slide relative to the through-hole 1131, so that the ejector rod 1311 slides to a position where the clamping protrusion of the accessory is locked, or to the position where the clamping protrusion of the accessory is unlocked.

In the photography lamp 100 provided in the embodiment of the present disclosure, the bracket 1314 includes a connecting rod 1315 and a pushing rod 1320 connected at an included angle. The connecting rod 1315 is connected with the ejector rod 1311, and the pushing rod 1320 extends in the direction of the front housing 113 away from the accessory slot 1140. In a condition that the bracket 1314 is installed in the housing 100, the connecting rod 1315 of the bracket 1314 is located on the side of the heat dissipation mechanism 122 facing the front housing 113, and the pushing rod 1320 is located on the side of the heat dissipation mechanism 122 facing the mid-frame 116 with the operating hole 1143. Therefore, the gap between the heat dissipation mechanism 122 and the housing is fully used, and the space occupied by the bracket 1314 is reduced to make the structure of the photography lamp 100 more compact and the overall volume smaller.

Wherein, the angle formed by connecting one end of the connecting rod 1315 and one end of the pushing rod 1320 can be 70°, 90°, 100°, etc., as long as in a condition that the bracket 1314 is installed in the mounting cavity 111 of the housing, the connecting rod 1315 of the bracket 1314 is located on the side of the heat dissipation mechanism 122 facing the front housing 113, and the pushing rod 1320 is located on the side of the heat dissipation mechanism 122 facing the mid-frame 116 with an operating hole 1143. There is no limitation herein.

Figure 5:
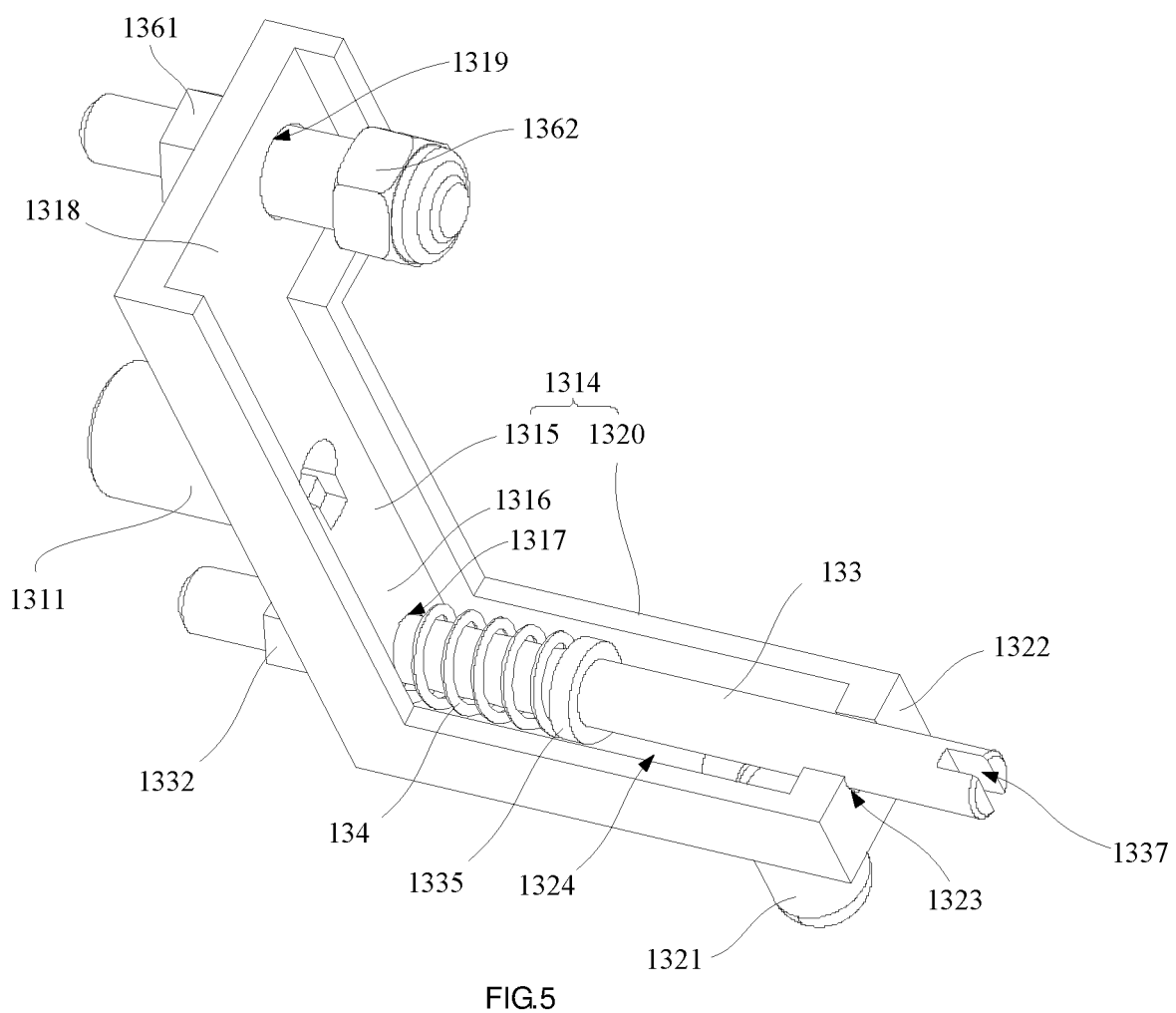
FIG. 5 is a schematic diagram of the assembly of bracket, an ejector rod, a first sliding rod, and a second sliding rod provided by an embodiment of the disclosure.

In some embodiments, as shown in FIG. 5, the photography lamp 100 comprises a first sliding rod 133, wherein an end of the first sliding rod 133 is connected to the side of the front housing 113 away from the accessory slot 1140, the first sliding rod 133s extends along the front housing 113 away from the accessory slot 1140, and the first sliding rod 133 is slidably connected with the bracket 1314 to enable the bracket 1314 to slidably connect with the front housing 113.

In a condition the pushing portion 1321 is manually applied with a force along the length of the first sliding rod 133, the bracket 1314 can be controlled to slide along the length of the first sliding rod 133 and the ejector rod 1311 is driven to slide along the length of the first sliding rod 133.

Optionally, as shown in FIG. 5, the photography lamp 100 comprises an elastic member 134, one end of the elastic member 134 is connected to the first sliding rod 133, and another end of the elastic member 134 is connected to the bracket 1314 to apply an elastic force to the bracket 1314 to enable the bracket 1314 to slide along the front housing 113 toward the accessory slot 1140. In a condition that the clamping protrusion on the accessory is locked into the bayonet 1142 on the side of the accessory slot 1140, the ejector rod 1311 will automatically extend into the mounting slot 1141 under the action of the elastic member 134 and limit the clamping protrusion in the bayonet 1142.

Wherein, the elastic member 134 includes springs, tension springs, torsion springs, rubber, elastic pieces, etc., as long as the elastic force can be applied to the bracket 1314 to make the bracket 1314 slide along the front housing 113 toward the accessory slot 1140. There is no limitation herein.

Optionally, the elastic member 134 is sleeved on the first sliding rod 133 to enable the elastic member 134 to connect with the first sliding rod 133 and the bracket 1314 more stably. Specifically, a first abutting portion 1335 is arranged on the first sliding rod 133, a second abutting portion 1316 is configured on the bracket 1314, the first abutting portion 1335 and the second abutting portion 1316 are distributed on both side of the elastic member 134 along the direction of the front housing 113 toward the accessory slot 1140; one end of the elastic member 134 abuts against the first abutting portion 1335, and another end of the elastic member 134 abuts against the second abutting portion 1316, so that an elastic force is applied to the bracket 1314 to make the bracket 1314 to slide along the front housing 113 toward the accessory slot 1140. Wherein, the elastic force exerted by the elastic member 134 on the bracket 1314 is a pushing force.

In the embodiment of the disclosure, the elastic member 134 is sleeved on the first sliding rod 133, one end of the elastic member 134 abuts against the first abutting portion 1335, and another end of the elastic member 134 abuts against the second abutting portion 1316. Therefore, the elastic force exerted by the elastic member 134 on the bracket 1314 is more stable.

In other embodiments, the elastic member 134 is located on the side of the bracket 1314 along the front housing 113 toward the accessory slot 1140, one end of the elastic member 134 is connected to the bracket 1314, and another end of the elastic member 134 is connected to the first sliding rod 133 to applied an elastic force to the bracket 1314 to make the bracket 1314 to slide along the front housing 113 toward the accessory slot 1140. Wherein the elastic force exerted by the elastic member 134 on the bracket 1314 is a pulling force.

In addition, it should be noted that the photography lamp 100 may not include the elastic member 134. In a condition that the clamping protrusion on the accessory is locked into the bayonet 1142 on the side of the accessory slot 1140, the pushing portion 1321 can be manually slide along the front housing 113 toward the accessory slot 1140 to drive the ejector rod 1311 to extend into the mounting slot 1141 and limit the clamping protrusions in the bayonet 1142.

Figure 6:
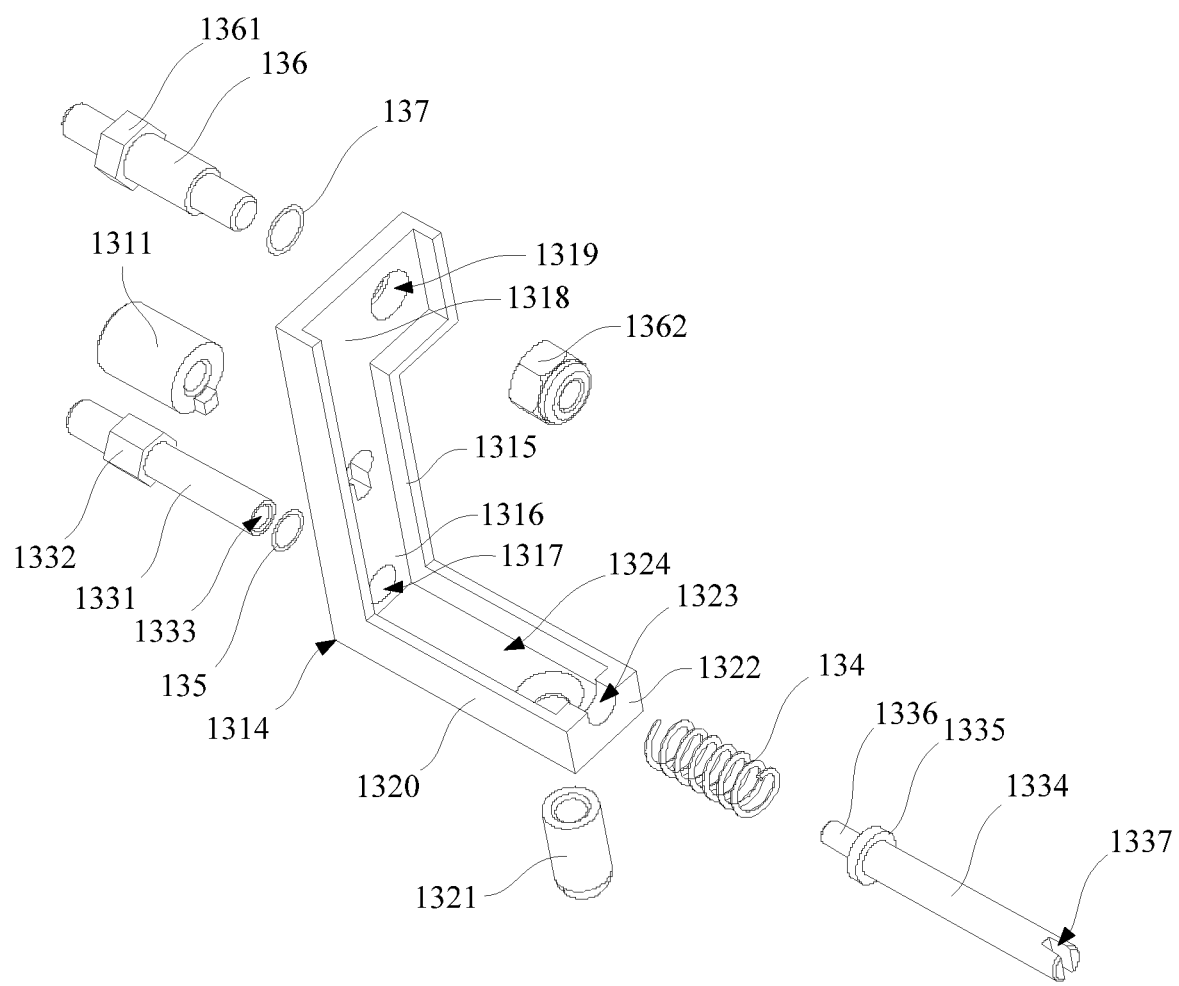
FIG. 6 is a schematic diagram of an exploded structure of the bracket, the ejector rod, the first sliding rod, and the second sliding rod provided by an embodiment of the disclosure.

Optionally, as shown in FIGS. 5 and 6, a first mounting hole 1317 is formed on the connecting rod 1315, the first sliding rod 133 is slidably mounted in the first mounting hole 1317 to enable the first sliding rod 133 to slidably connect to the bracket 1314. The bracket 1314 is slidably fitted with the first sliding rod 133 through the first mounting hole 1317 on the connecting rod 1315, which can make the sliding connection between the bracket 1314 and the first sliding rod 133 more stable.

Wherein, the first sliding rod 133 is located on the side of the ejector rod 1311 close to the pushing rod 1320, so that the distance between the first sliding rod 133 and the pushing portion 1321 is reduced and a force moment of the manual force applied to the pushing portion 1321 at the connecting position between the sliding rod and the connecting rod 1315. Therefore, a large radial force between the connecting rod 1315 and the first sliding rod 133 is prevent and a friction between the connecting rod 1315 and the first sliding rod 133 is reduced. The connecting rod 1315 can be driven to slide more smoothly relative to the first sliding rod 133.

As shown in FIGS. 5 AND 6, a sliding portion 1322 slidably connected to the first sliding rod 133 is provided on one end of the pushing rod 1320 away from the connecting rod 1315, so that the bracket 1314 is slidably connected to the first sliding rod 133 more stably. It can be understood that the sliding portion 1322 may be a baffle structure with a gap. It is just named the sliding portion here for the convenience of describing the relative movement relationship of the first sliding rod 133.

Optionally, the sliding portion 1322 is protudingly arranged on a side of the pushing rod 1320 facing the first sliding rod 133, and a surface of the sliding portion 1322 at one end in the protruding direction slidably abuts against the outer peripheral surface of the first sliding rod 133 to enable the sliding portion 1322 to slidably connect to the first sliding rod 133. Therefore, the sliding portion 1322 and the first sliding rod 133 can be slidably connected more conveniently.

Wherein, a sliding groove 1323 that is adapted to the surface of the first sliding rod 133 is arranged along the surface of sliding portion 1322 in the protruding direction. It can be understood that a notch is provided between the two protrusions of the sliding portion to form the sliding groove 1323. Therefore, the sliding groove 1323 on the sliding portion 1322 can limit the first sliding rod 133, so that the connection between the sliding portion 1322 and the first sliding rod 133 is more stable.

In other embodiments, a third mounting hole is formed on the sliding portion 1322, wherein the first sliding rod 133 is slidably mounted in the third mounting hole, and the first sliding rod 133 and the sliding portion 1322 are slidably connected.

As shown in FIG. 5, an accommodating groove 1324 is arranged on the side of the pushing rod 1320 facing the first sliding rod 133, a part of the first sliding rod 133 is disposed in the accommodating groove 1324, wherein the elastic member 134 is disposed in the accommodating groove 1324. Therefore, the inner wall of the accommodating groove 1324 can protect the elastic member 134 from colliding with other structures of the photography lamp 100.

As shown in FIGS. 5 and 6, the first sliding rod 133 comprises a first limiting portion 1332 arranged on a side of the bracket 1314 away from the elastic member 134, the first limiting portion 1332 is configured to abut against the bracket 1314 to limit a moving distance of bracket 1314 relative to the first sliding rod 133 along the front housing 113 toward the accessory slot 1140. By providing the first limiting portion 1332 on the first sliding rod 133, the first limiting portion 1332 can abut against the bracket 1314 and limit the bracket 1314 continues to slide along the front housing 113 toward the accessory slot 1140 when the bracket 1314 has slid a certain distance along the front housing 113 toward the accessory slot 1140, which can prevent the extension of the ejector rod 1311 into the accessory slot 1140 from being too long and the inconvenient installation of accessories.

A first cushion member 135 is arranged on a side of the first limiting portion 1332 close to the bracket 1314 to form a cushion between the first limiting portion 1332 and the bracket 1314 to reduce the sound from the contact between the first limiting portion 1332 and the bracket 1314. Wherein, the first cushion member 135 includes an annular rubber pad, and the annular rubber pad is sleeved on the first sliding rod 133. Alternatively, the first cushion member 135 may also be a cushion member arranged on the side of the first limiting portion 1332 close to the bracket 1314, such as sponge, foam, etc. It is not limited here.

As shown in FIG. 6, the first sliding rod 133 comprises a first sub-sliding rod 1331 and a second sub-sliding rod 1334 that are detachably connected in sequence along a length direction of the first sliding rod 133, one end of the first sub-sliding rod 1331 away from the second sub-sliding rod 1334 is connected to the front housing 113, the elastic member 134 is sleeved on the first sub-sliding rod 1331, wherein the first abutting portion 1335 is arranged on the second sub-sliding rod 1334.

In a condition that the first sub-sliding rod 1331 and the second sub-sliding rod 1334 are connected, one end of the elastic member 134 sleeved on the second sub-sliding rod 1334 abuts against the first abutting portion 1335. And when the first sliding rod 133 formed by connecting the sub-sliding rod and the second sub-sliding rod 1334 is connected to the bracket 1314, the other end of the elastic member 134 abuts against the second abutting portion 1316 of the bracket 1314, so that the assembly of the elastic member 134, the first sliding rod 133 and the bracket 1314 is more convenient.

Specifically, as shown in FIGS. 5 and 6, an outer peripheral surface of the first sub-sliding rod 1331 away from the second sub-sliding rod 1334 is provided with an external thread. A first connecting hole with an internal thread is formed in the position of the front housing 113 corresponding to the first sub-sliding rod 1331. One end of the first sub-sliding rod 1331 is inserted into the first connecting hole, and the external thread at the end of the first sub-sliding rod 1331 away from the second sub-sliding rod 1334 is screwed to the internal thread in the first connecting hole of the housing. Therefore, the first sub-sliding rod 1331 and the front housing 113 are connected.

The first limiting portion 1332 is disposed on the first sub-sliding rod 1331. Specifically, the first limiting portion 1332 is protudingly arranged on the outer peripheral surface of the first sub-sliding rod 1331. The first limiting portion 1332 extends along the circumferential direction of the first sub-sliding rod 1331 in an annular structure. Wherein, the cross section of the outer peripheral surface of the first limiting portion 1332 is formed in a polygonal shape, so as to facilitate the use of a wrench or other tools to screw the end of the first sub-sliding rod 1331 away from the second sub-sliding rod 1334 into the first connecting hole by the first limiting portion 1332.

The end surface of the first sub-sliding rod 1331 close to the second sub-sliding rod 1334 is provided with a threaded hole 1333, and the end of the second sub-sliding rod 1334 close to the first sub-sliding rod 1331 is provided with a threaded post 1336 adapted to the threaded hole 1333. The first sub-sliding rod 1331 and the second sub-sliding rod 1334 can be connected by screwing the threaded post 1336 into the threaded hole 1333. Wherein, the end surface at the end of the second sub-sliding rod 1334 away from the first sub-sliding rod 1331 is also provided with a screwdriver opening 1337, so that the threaded post 1336 of the second sub-sliding rod 1334 can be screwed into the threaded hole 1333 of the first sub-sliding rod 1331 by using a screwdriver. The first abutting portion 1335 is protudingly provided on the outer peripheral surface of the second sub-sliding rod

1334. The first abutting portion 1335 extends along the circumferential direction of the second sub-sliding rod 1334 in an annular structure.

As shown in FIGS. 4, 5, and 6, the photography lamp 100 further comprises a second sliding rod 136 extending along the front housing 113 away from the accessory slot 1140, wherein one end of the second sliding rod 136 is connected to the side of the front housing 113 away from the accessory slot 1140, the second sliding rod 136 and the first sliding rod 133 are arranged side by side along the length of the connecting rod 1315, and the second sliding rod 136 is slidably connected to the bracket 1314.

The bracket 1314 of the photography lamp 100 is slidably connected to the front housing 113 by the first sliding rod 133 and the second sliding rod 136 respectively, which can make the sliding connection between the bracket 1314 and the front housing 113 more stable.

Wherein, the second sliding rod 136 is slidably connected to the end of the connecting rod 1315 away from the pushing rod 1320, so that the force distribution between bracket 1314 and the first sliding rod 133 and the second sliding rod 136 is more uniform, and it is not easy to be stuck when the bracket 1314 slide relative to the first sliding rod 133 and the second sliding rod 136.

Optionally, a connecting portion 1318 is configured to extend from one end of the connecting rod 1315 away from the pushing rod 1320, the extending direction of the connecting portion 1318 is in line with the length direction of the connecting rod 1315 and the pushing rod 1320; a mounting hole is arranged on the connecting portion 1318, and the second sliding rod 136 is slidably mounted in the mounting hole to enable the second sliding rod 136 to slidably connect with the connecting portion 1318. Both the first sliding rod 133 and the second sliding rod 136 can be connected to the front edge of the housing. On the one hand, other components (such as heat dissipation mechanism 122) are retreated, on the other hand, the space that the bracket 1314 occupies in the housing is reduced and the redundant space in the housing is fully used.

As shown in FIGS. 5 and 6, a second mounting hole 1319 is arranged on the connecting rod 1315 and configured to penetrate the connecting rod 1315 along the length direction of the ejector rod 1311, and the second sliding rod 136 is slidably mounted in the second mounting hole 1319 to enable the second sliding rod 136 to slidably connect with the bracket 1314. The bracket 1314 is slidably fitted with the second sliding rod 136 through the second mounting hole 1319 on the connecting rod 1315, so that the bracket 1314 and the second sliding rod 136 are slidably connected stably.

As shown in FIGS. 5 and 6, the second sliding rod 136 is provided with a second limiting portion 1361 located on the side of the bracket 1314 along the front housing 113 toward the accessory slot 1140, the second limiting portion 1361 is configured to abut against the bracket 1314 to limit a moving distance of bracket 1314 relative to the second sliding rod 136 along the front housing 113 toward the accessory slot 1140. By providing the second limiting portion 1361 on the second sliding rod 136, the second limiting portion 1361 can abut against the bracket 1314 and limit the bracket 1314 continues to slide along the front housing 113 toward the accessory slot 1140 when the bracket 1314 has slid a certain distance along the front housing 113 toward the accessory slot 1140, which can prevent the extension of the ejector rod 1311 into the accessory slot 1140 from being too long and the inconvenient installation of accessories.

Wherein, a second cushion member 137 is arranged on a side of the second limiting portion 1361 close to the bracket 1314 to form a cushion between the second limiting portion 1361 and the bracket 1314 to reduce the sound from the contact between the second limiting portion 1361 and the bracket 1314. Wherein, the second cushion member 137 includes an annular rubber pad, and the annular rubber pad is sleeved on the second sliding rod 136. Alternatively, the second cushion member 137 may also be a cushion member arranged on the side of the second limiting portion 1361 close to the bracket 1314, such as sponge, foam, etc. It is not limited here.

As shown in FIGS. 5 and 6, the second sliding rod 136 is provided further with a stopping portion 1362 located on the side of the bracket 1314 along the front housing 113 toward the accessory slot 1140, and the stopping portion 1362 is configured to abut against the bracket 1314 to limit a moving distance of bracket 1314 relative to the second sliding rod 136 along the front housing 113 away from the accessory slot 1140. In a condition that the bracket 1314 slides a certain distance along the front housing 113 away from the accessory slot 1140, the stopping portion 1362 can abut against the bracket 1314 and limit the bracket 1314 continues to slide along the front housing 113 away from the accessory slot 1140 to prevent the bracket 1314 from colliding with other structures of the photography lamp 100.

Specifically, as shown in FIGS. 5 and 6, an outer peripheral surface of the second sliding rod 136 is provided with an external thread. A second connecting hole with an internal thread is formed in the position of the front housing 113 corresponding to the second sliding rod 136. One end of the second sliding rod 136 is inserted into the second connecting hole, and the external thread of the second sliding rod 136 is screwed to the internal thread in the second connecting hole of the housing. Therefore, the second sliding rod 136 and the front housing 113 are connected.

The stopping portion 1362 is detachably connected to the other end of the second sliding rod 136. A threaded post 1336 is arranged on the other end of the second sliding rod 136. A threaded hole 1333 adapted to the threaded post 1336 is formed on the stopping portion 1362. The threaded hole 1333 on the stopping portion 1362 and the threaded post 1336 on the other end of the second sliding rod 136 are screwed together to make the stopping portion 1362 and the other end of the second sliding rod 136 to be detachably connected.

As shown in FIGS. 5 and 6, the pushing portion 1321 is provided in a rod shape. One end of the pushing portion 1321 is connected to the pushing rod 1320, and another end of the pushing portion 1321 is a free end. The length direction of the pushing portion 1321 is consistent with the length direction of the connecting rod 1315. The free end of the pushing portion 1321 is configured to pass through the operating hole 1143 and protrude from the outer surface of the housing 110. Wherein, the pushing portion 1321 and the pushing rod 1320 are detachably connected by detachable connection such as screw connection, snap connection, which is not limited here. Of course, the pushing portion 1321 and the pushing rod 1320 may also be fixedly connected by welding, pasting, or the like, or the pushing portion 1321 and the pushing rod 1320 are integrally formed.

As shown in FIGS. 5 and 6, the ejector rod 1311 and the connecting rod 1315 are detachably connected by detachable connection such as screw connection, snap connection, etc. Of course, the ejector rod 1311 and the connecting rod 1315 may also be fixedly connected by welding, pasting, or the like, or the ejector rod 1311 and the connecting rod 1315 are integrally formed.

The connection direction of the ejector rod 1311 and the bracket 1314 with the front housing 113 will be described as following.

When connecting the ejector rod 1311 and the bracket 1314 with the front housing 113, the ejector rod 1311 is connected to the bracket 1314 at first, then the first sub-sliding rod 1331 of the first sliding rod 133 and the second sliding rod 136 are connected to the bracket 1314. Afterwards, the first mounting hole 1317 first mounting hole 1317 1317 and the second mounting hole 1319 of the bracket 1314 are respectively sleeved on the first sub-sliding rod 1331 of the first sliding rod 133 and the second sliding rod 136 to enable the bracket 1314 to slidably connect to the first sub-sliding rod 1331 and the second sliding rod 136.

Afterwards, the elastic member 134 is sleeved on the first sub-sliding rod 1331 from the end of the first sub-sliding rod 1331 close to the second sub-sliding rod 1334, and the second sub-sliding rod 1334 is connected with the first sub-sliding rod 1331 to slidably connect the sliding portion 1322 1322 of the bracket 1314 and the second sub-sliding rod 1334. Finally, the first sliding rod 133 and the second sliding rod 136 are connected to the front housing 113 to complete the connection of the ejector rod 1311 and the bracket 1314 with the front housing 113.

Optionally, as shown in FIGS. 2 and 4, the front housing 113 includes a front housing cover 113 and a front housing shell 115. The front housing cover 113 is provided with a fourth mounting hole 1144 penetrating the front housing cover 113 and communicating with the mounting cavity 111.

A mounting slot 1141 is arranged on the surface of the front housing cover 113 away from the mounting cavity 111, and a bayonet 1142 is arranged on the side of the mounting slot 1141. Wherein, the mounting slot 1141 penetrates the front housing cover 113. The number of the mounting slot 1141 is multiple, a plurality of mounting slot 1141s are distributed around the fourth mounting hole 1144, and the side surface of each installation groove is recessed to form a bayonet 1142.

The front housing 113 includes a mounting cylinder 1151 with two openings at both ends, and a mounting plate 1153 1153 connected to the edge of one end of the mounting cylinder 1151. The mounting plate 1153 is configured to protrude from the outer peripheral surface of the mounting cylinder 1151. The mounting plate 1153 extends along the circumferential direction of the mounting cylinder 1151 in an annular structure. An angle is formed between the surface of the mounting plate 1153 and the axial direction of the mounting cylinder 1151. Another end of the mounting cylinder 1151 passes through the fourth mounting hole 1144 from the side of the front housing cover 113 facing the mounting cavity 111, and protrudes from the surface of the front housing 113 cover away from the mounting cavity 111. a light-transmitting hole 1152 is arranged in the mounting cylinder 1151. An optical lens is installed in the light-transmitting hole 1152. The mounting plate 1153 is located on the side of the front housing cover 113 facing the mounting cavity 111. the mounting plate 1153 and the mounting slot 1141 on the front housing cover 113 are overlapping. A through-hole 1131 is formed at the position of the mounting plate 1153 corresponding to the mounting slot 1141.

The first sliding rod 133 of the photography lamp 100 is connected to the side of the front housing cover 113 toward the mounting cavity 111. The second sliding rod 136 of the photography lamp 100 is connected to a side of the mounting plate 1153 of the front housing shell 115 away from the front housing 113.

For the specific implementation of each of the above operations, please refer to the previous embodiment, which will not be repeated here.

While the present disclosure has been described with the embodiments, it is preferable that the above embodiments should not be construed as limiting of the present disclosure. On the contrary, the present disclosure includes all the modifications and variations without departing from the spirit and scope of the present disclosure.

What is claimed is:

1. A photography lamp, comprising:
a housing with a front housing and a mid-frame, wherein an accessory slot with a through-hole is arrange on a side of the front housing, and an operating hole is formed on an outer surface of the mid-frame;
an ejector rod movably arranged in the through-hole;
a bracket arranged on another side of the front housing away from the accessory slot and slidably connected to the front housing; wherein the bracket comprises a connecting rod and a pushing rod connected at an included angle, the pushing rod connected with a pushing portion extends along the front housing away from the accessory slot, the pushing portion is configured to pass through the operating hole, the connecting rod is connected to the ejector rod, and the pushing portion is used to receive the external force input by a user to drive the ejector rod to slide relative to the through-hole.

2. The photography lamp as claimed in claim 1, further comprising a first sliding rod, wherein an end of the first sliding rod is connected to the side of the front housing away from the accessory slot, the first sliding rod extends along the front housing away from the accessory slot, and the first sliding rod is slidably connected with the bracket to enable the bracket to slidably connect with the front housing.

3. The photography lamp as claimed in claim 2, further comprising an elastic member, one end of the elastic member is connected to the first sliding rod, and another end of the elastic member is connected to the bracket to apply an elastic force to the bracket to enable the bracket to slide along the front housing toward the accessory slot.

4. The photography lamp as claimed in claim 3, wherein the elastic member is sleeved on the first sliding rod; a first abutting portion is arranged on the first sliding rod, a second abutting portion is configured on the bracket, the first abutting portion and the second abutting portion are distributed on both side of the elastic member along a direction of the front housing toward the accessory slot; one end of the elastic member abuts against the first abutting portion, and another end of the elastic member abuts against the second abutting portion,
wherein a first mounting hole is formed on the connecting rod, the first sliding rod is slidably mounted in the first mounting hole to enable the first sliding rod to slidably connect to the bracket;
wherein a sliding portion slidably connected to the first sliding rod is provided on one end of the pushing rod away from the connecting rod.

5. The photography lamp as claimed in claim 4, wherein the first sliding rod is located on a side of the ejector rod close to the pushing rod;
wherein the sliding portion is protrudingly arranged on a side of the pushing rod facing the first sliding rod, and a surface of the sliding portion at one end in a protruding direction slidably abuts against an outer peripheral surface of the first sliding rod to enable the sliding portion to slidably connect to the first sliding rod.

6. The photography lamp as claimed in claim 5, wherein the first sliding rod comprises a first limiting portion arranged on a side of the bracket away from the elastic member, the first limiting portion is configured to abut against the bracket to limit a moving distance of bracket relative to the first sliding rod along the front housing toward the accessory slot.

7. The photography lamp as claimed in claim 6, wherein a first cushion member is arranged on a side of the first limiting portion close to the bracket.

8. The photography lamp as claimed in claim 5, wherein an accommodating groove is arranged on the side of the pushing rod facing the first sliding rod, part of the first sliding rod is disposed in the accommodating groove, and the elastic member is disposed in the accommodating groove.

9. The photography lamp as claimed in claim 4, wherein the first sliding rod comprises a first sub-sliding rod and a second sub-sliding rod that are detachably connected in sequence along a length direction of the first sliding rod, one end of the first sub-sliding rod away from the second sub-sliding rod is connect to the front housing, the elastic member is sleeved on the first sub-sliding rod, wherein the first abutting portion is arranged on the second sub-sliding rod.

10. The photography lamp as claimed in claim 1, further comprising a second sliding rod extending along the front housing away from the accessory slot, wherein one end of the second sliding rod is connected to the side of the front housing away from the accessory slot, the second sliding rod and the first sliding rod are arranged side by side along the length of the connecting rod, and the second sliding rod is slidably connected to the bracket.

11. The photography lamp as claimed in claim 10, wherein the second sliding rod is provided with a second limiting portion located on a side of the bracket along the front housing toward the accessory slot, the second limiting portion is configured to abut against the bracket to limit a moving distance of bracket relative to the second sliding rod along the front housing toward the accessory slot.

12. The photography lamp as claimed in claim 11, wherein a second cushion member is arranged on a side of the second limiting portion close to the bracket.

13. The photography lamp as claimed in claim 11, wherein the second sliding rod is provided further with a stopping portion located on the side of the bracket along the front housing toward the accessory slot, and the stopping portion is configured to abut against the bracket to limit a moving distance of bracket relative to the second sliding rod along the front housing away from the accessory slot.

14. The photography lamp as claimed in claim 10, wherein a connecting portion is configured to extend from one end of the connecting rod away from the pushing rod, an extending direction of the connecting portion is in line with a length direction of the connecting rod and the pushing rod; a mounting hole is arranged on the connecting portion, and the second sliding rod is slidably mounted in the mounting hole to enable the second sliding rod to slidably connect with the connecting portion.

15. The photography lamp as claimed in claim 10, wherein a second mounting hole is arranged on the connecting rod and configured to penetrate the connecting rod along a length direction of the ejector rod, and the second sliding rod is slidably mounted in the second mounting hole to enable the second sliding rod to slidably connect with the bracket.

* * * * *